(12) United States Patent
Crockatt et al.

(10) Patent No.: US 12,479,787 B2
(45) Date of Patent: Nov. 25, 2025

(54) ACIDIC ELIMINATION FOR BIO-BASED AROMATICS

(71) Applicant: Nederlandse Organisatie voor toegepast-natuurwetenschappelijk onderzoek TNO, 's-Gravenhage (NL)

(72) Inventors: Marc Crockatt, 's-Hertogenbosch (NL); Jan Cornelis Van Der Waal, Delft (NL); Johan Urbanus, 's-Gravenhage (NL)

(73) Assignee: NEDERLANDSE ORGANISATIE VOOR TOEGEPAST-NATUURWETENSCHAPPELIJK ONDERZOEK TNO, 'S-Gravenhage (NL)

( * ) Notice: Subject to any disclaimer, the term of this patent is extended or adjusted under 35 U.S.C. 154(b) by 0 days.

(21) Appl. No.: 17/761,808

(22) PCT Filed: Oct. 5, 2020

(86) PCT No.: PCT/NL2020/050616
§ 371 (c)(1),
(2) Date: Mar. 18, 2022

(87) PCT Pub. No.: WO2021/066658
PCT Pub. Date: Apr. 8, 2021

(65) Prior Publication Data
US 2022/0363624 A1  Nov. 17, 2022

(30) Foreign Application Priority Data
Oct. 3, 2019  (EP) .................................... 19201308

(51) Int. Cl.
*C07C 51/087* (2006.01)
*C07C 63/15* (2006.01)

(52) U.S. Cl.
CPC ............ *C07C 51/087* (2013.01); *C07C 63/15* (2013.01)

(58) Field of Classification Search
None
See application file for complete search history.

(56) References Cited

U.S. PATENT DOCUMENTS 7,658,937 B2  2/2010  Nair et al.
2010/0127220 A1*  5/2010  Tierney ................. C07F 7/0805
                                                       252/301.16

FOREIGN PATENT DOCUMENTS

JP  2016193897 A  11/2016
WO  2005113478 A2  12/2005
(Continued)

OTHER PUBLICATIONS

Molarity of Concentrated Acids and Bases (downloaded from https://www.nestgrp.com/protocols/trng/molarity.shtml on Apr. 25, 2023) (Year: 2023).*

(Continued)

*Primary Examiner* — Amy C Bonaparte
(74) *Attorney, Agent, or Firm* — LUCAS & MERCANTI, LLP (57) ABSTRACT

A process for the preparation of an aromatic product is disclosed which includes a step b) of contacting one or more intermediate compounds with a further acid to form the aromatic product. The intermediate compounds can be obtained in step a) that includes contacting a 7-oxabicyclo [2.2.1]hept-2-ene core structure with an acidic mixture. The amount of acid in step b) is higher than the amount of acid in step a).

14 Claims, 6 Drawing Sheets

(56) References Cited

FOREIGN PATENT DOCUMENTS

| WO | 2008128618 | A1 |   | 10/2008 |             |
|----|------------|----|---|---------|-------------|
| WO | 2010012442 | A2 |   | 2/2010  |             |
| WO | WO-2013048248 | A1 | * | 4/2013 | ............. C07C 51/16 |
| WO | 2016099274 | A1 |   | 6/2016  |             |
| WO | 2017004349 | A2 |   | 1/2017  |             |
| WO | WO-2019212338 | A1 | * | 11/2019 | ............. C07C 253/30 |
| WO | WO-2020046124 | A1 | * | 3/2020 | ............. C07C 61/09 |

OTHER PUBLICATIONS

Chan ("A Stable Derivative of Cyclooctatrienyne" Tetrahedron, 1986, vol. 42, p. 655) (Year: 1986).*

Lachapelle ("The molecular conformations of 8, 11-dimethyl-5,6-benzo-2-oxo-1,3,2-dioxathiepin and 4,4-dimethyl-5,6-benzo-2-oxo-1,3,2-dioxathiepin" Can. J. Chem, 1985, vol. 63, p. 2185) (Year: 1985).*

Newman ("The Behavior of 3,6-Dimethylphthalic Anhydride in Friedel-Crafts and Grignard Condensations" J. Am. Chem. Soc, 1944, vol. 66, p. 733) (Year: 1944).*

Zhaojia Lin, et al., "Phthalic Anhydride Production From Hemicellulose Solutions: Technoeconomic Analysis and Life Cycle Assessment" AIChE Journal, vol. 61, No. 11, pp. 3708-3718, 2015.

Mugunthu R. Dhananjeyan, et al., "Synthesis and Activity of Substituted Anthraquinones Against a Human Filarial Parasite, Brugia Malayi" Journal of Medicinal Chemistry vol. 48, No. 8, pp. 2822-2830, 2005.

Jan-Anders H. Nasman, "A Versatile Synthetic Route to 3-Hydroxyphthalic Anhydride", Synthesis, vol. 8, pp. 788-789, 1985.

Ketaki Ghosh, et al., "Total Synthesis of Neo-Tanshinlactones Through a Cascade Benzannulation-Lactonization as the Key Step", European Journal of Organic Chemistry vol. 19 pp. 4037-4046, 2013.

Mika Shiramizu, et al., "On the Diels-Alder Approach to Solely Biomass-Derived Polyethylene Terephthalate (PET): Conversion of 2,5-Dimethylfuran and Acrolein Into P-Xylene" Chemistry A European Journal, vol. 17, No. 44, pp. 12452-12457, 2011.

Sambasivarao Kotha, et al., "Enantioselective Synthesis of (+)-4-Demethoxy-1,4-Dimethyldaunomycinone", Bioorganic & Medicinal Chemistry, vol. 10, No. 3, pp. 621-624, 2002.

Tze-Lock Chan, et al., "Synthesis and Crystal Structures of 1,4,7,10-Tetramethyl-5,6-Didehydrodibenzo[a,e]Cyclooctene . . . ", Tetrahedron, vol. 42, No. 2, pp. 655-661, 1986.

Hans Hennige, et al., "3-Alkoxy-1H-Isoindole—Synthesen Und Eigenschaften", Chemische Berichte, vol. 121, No. 2, pp. 243-252, 1988.

Yvonne Kirchwehm, et al., Ortho-Methylated Tribenzotriquinacenes—Paving the Way to Curved Carbon Networks . . . , Chemical Communications, vol. 48, No. 10, pp. 1502-1504, 2012.

Shanmugam Thiyagarajan, et al., "Substituted Phthalic Anhydrides From Biobased Furanics: A New Approach to Renewable Aromatics", ChemSusChem, vol. 8, No. 18, pp. 3052-3056, 2015.

Shanmugam Thiyagarajan, et al., "A Facile Solid-Phase Route to Renewable Aromatic Chemicals From Biobased Furanics", Acie, vol. 55, No. 4, pp. 1368-1371, 2016.

M. Newman, et al., "Improved Synthesis of 3-Methylphthalic Anhydride", J. Org. Chem. vol. 42, No. 8, pp. 1478-1479, 1977.

Eyas Mahmoud, et al., "Renewable Production of Phthalic Anhydride From Biomass-Derived Furan and Maleic Anhydride", Green Chemistry, vol. 16, No. 1, pp. 167-175, 2014.

Lingli Ni, et al., "One-Step Conversion of Biomass-Derived Furanics Into Aromatics by Bronsted Acid Ionic Liquids at Room Temperature", ACS Sustainable Chemistry & Engineering, vol. 6, pp. 2541-2551, 2018.

Lingli Ni, et al., A Simple and Mild Approach for the Synthesis of p-Xylene From Bio-Based 2,5-Dimethyfuran by Using Metal Triflates, ChemSusChem, vol. 10, pp. 2394-2401, 2017.

M. P. Cava, et al., "2-Acetoxyfuran. A Study of Its Preparation and Its Behavior as a Diene", Journal of The American Chemical Society, vol. 78, No. 10, pp. 2303-2304, 1956.

International Search Report and Written Opinion for Corresponding International Application No. PCT/NL2020/050616 (10 Pages) (Nov. 19, 2020).

* cited by examiner

ACIDIC ELIMINATION FOR BIO-BASED AROMATICS

CROSS-REFERENCE TO RELATED APPLICATIONS

This application is a 371 of PCT/NL2020/050616, filed Oct. 5, 2020, which claims the benefit of European Patent Application No. 19201308.4, filed Oct. 3, 2019.

FIELD OF THE INVENTION

The invention relates to the preparation of an aromatic product from a cycloadduct comprising a 7-oxabicyclo[2.2.1]hept-2-ene core structure or from an intermediate, possibly ring-opened compound formed in this process.

BACKGROUND OF THE INVENTION

Worldwide there is growing consumption of aromatic molecules in fuels, plastics, coatings, textiles and many other applications. Said aromatic molecules are supplied from fossil fuels and security of feedstock supply has become much more important due to the recent developments in shale gas and increased fluctuations in oil price. Furthermore, there is a growing demand for sustainability, expressed in the use of renewable feedstock and the reduction of $CO_2$-footprint. As such, there is an increasing need for sustainable processes for the production of aromatic molecules (e.g. phthalic anhydride derivatives, benzenetricarboxylic acids etc.). Biomass, which is renewable and $CO_2$-neutral, appears to offer a good opportunity as an aromatic source.

Biomass consists of predominantly two components: lignin and (hemi-) cellulose. Both are polymeric macromolecules, where lignin consists of aromatic monomers and (hemi-)cellulose consists of C5 and C6 sugars. Superficially, lignin seems the most promising source for renewable aromatics, however, its depolymerization and the consequent selective isolation of aromatic monomers has proven to be cumbersome. In terms of selectivity, C5 and C6 sugars from (hemi-) cellulose, like glucose, xylose, mannose and arabinose, offer more potential as a source for renewable aromatics. Said sugars can easily be converted to 2,5-bis(hydroxymethyl)furan, 5-(hydroxymethyl)furfural, 5-methoxymethylfurfural, 5-chloromethylfurfural, 2,5-dimethylfuran, furfural, furfuryl alcohol, 2-methylfuran or furan. Said compounds show promising opportunities for a sustainable process to synthesize aromatic compounds.

For instance, the furan core of the compounds mentioned in the paragraph above is able to react as a diene in a Diels-Alder reaction with dienophiles. The cycloadduct formed during said reaction can undergo a ring-opening and be carried on in further processing to yield aromatic products. Certain specific approaches for this are currently published for small scale, inefficient or expensive, batch experiments, which have limited potential to produce the millions of tons of aromatics required each year by industry.

For instance, *Green Chemistry*, 2014, 16, 167-175 describes the production of phthalic anhydride by reacting furan with maleic anhydride followed by a second reaction with mixed-sulfonic carboxylic anhydrides in excess methanesulfonic acid. A downside to the disclosed process is that methanesulfonic acid is used in a large access (10 molar equivalents), is expensive, and very difficult to recover and recycle, meaning that achieving significant production scale with this process is unlikely. Furthermore, the phthalic anhydride must be extracted with large volumes of toluene or the addition of water for quenching the reaction, destroying the anhydride formed in said process.

In WO 2010/012442 and Newman et al. JOC 42 (1977) 1478-1479, a ring-opening process for the preparation of 3-methylphthalic anhydride with sulfuric acid and sulfolane as co-solvent is reported. The conversion of the adduct of 2-acetoxyfuran and maleic anhydride into 3-acetoxyphthalic anhydride with acetic anhydride containing sulfuric acid is reported in Cava et al. JACS 78 (1956) 2303-2304. Yields, however, are generally poor.

Therefore, it remains of great interest to develop scalable technologies for the production process of renewable aromatics and an object of the present invention is to provide a process for the formation of an aromatic product from a cycloadduct comprising a 7-oxabicyclo[2.2.1]hept-2-ene core structure that does not suffer from one or more of the above-mentioned drawbacks.

SUMMARY OF THE INVENTION

The present inventors found that the aromatization process of a cycloadduct comprising a 7-oxabicyclo[2.2.1]hept-2-ene core structure A proceeds via one or more intermediate compounds, probably including a ring-opened compound B, which upon elimination of the OAct-groups, leads to the aromatic product C, as illustrated in Scheme 1, wherein the core structures of compounds A, B and C are shown.

The inventors found that the yield of the aromatic product C is negatively influenced by the amount of acid that is used for the ring-opening of the cycloadduct. It is hypothesized that this is inter alia caused by a retro-Diels-Alder reaction of the cycloadduct, possibly followed by decomposition (e.g. polymerization) of the resulting products of this retro-Diels-Alder reaction. However, the inventors surprisingly further found that if the amount of acid is increased during the process by addition of a further acid, the overall yield can actually be increased and/or the reaction time required can significantly be reduced, in particular when the further acid is added around the moment that the cycloadduct A has been fully converted. Accordingly, the present invention is directed to a process for the preparation of an aromatic product C, said process comprising a step b) of contacting a ring-opened compound B with a further acid to form the aromatic product C.

DETAILED DESCRIPTION OF THE INVENTION

In particular, the invention is directed to a process for the preparation of an aromatic product according to formulae IIIa or IIIb (herein also together referred to as formula III), said process comprising a step a) of contacting a cycloadduct according to formula I with an acidic mixture comprising a first acid and optionally an activating agent to obtain one or more intermediate compounds, which is followed by a step b) of contacting a one or more intermediate compounds (herein also referred to as one or more intermediates) with a further acid to form an aromatic product according to formulae IIIa or IIIb, as illustrated in Scheme 2, Scheme 2 wherein, $R_1$ and/or $R_2$ are independently selected from the group consisting of H, $C_1$-$C_{20}$ alkyl, CHO and hydrazones, oximes, hemiacetals and acetals thereof, $CH_2OH$ and esters and ethers thereof, $CO_2H$ and esters thereof, and amides and tertiary amines of $CH_2NH_2$ and optionally polymer-supported; preferably wherein $R_1$ and $R_2$ both are H or methyl, or $R_1$ is hydrogen and $R_2$ is methyl;

$R_3$ and/or $R_4$ are independently selected from the group consisting of H, $CH_3$, acetals, hemiacetals, hydrazones and oximes of CHO, $CH_2OH$ and esters and ethers thereof, $CO_2H$ and esters thereof, amides and tertiary amines of $CH_2NH_2$, and one or more electron-withdrawing groups preferably selected from the group consisting of $CF_3$, $CCl_3$, $CBr_3$, $CI_3$, $NO_2$, CN, $SO_2Q$, $SO_3Q$, COQ, COF, COCl, COBr, COI, $CO_2Q$, C(O)NQ, and C(=NT)Q, wherein Q and T are independently H, or linear or branched $C_1$-$C_8$-alkyl, optionally substituted with halogens and optionally polymer-supported, or $R_3$ and $R_4$ together represent —(CO)X(CO)—, wherein X=O, $CH_2$, NH, NMe, NEt, NPr, NBu, NPh, or S; preferably $R_3$ and $R_4$ together represent —(CO)O(CO)—, —(CO)NMe(CO)—, —(CO)NEt(CO)— or —(CO)NPr(CO)—;

or $R_2$ and $R_4$ together represent —$CH_2$ZC(O)—, wherein Z is selected from the group consisting of O, NH and S;

═════ represent a single or double bond, preferably a single bond.

Whether the aromatic product according to formula IIIa or according to formula IIIb is formed, depends on the presence of the single or double bond as represented by ═════ and explained in further detail below.

The intermediate compounds generally comprise a mixture of compounds which can each lead to the aromatic product III. The intermediates are generally insufficiently stable to be isolated and fully analyzed. Based on structural determination including nuclear magnetic resonance, it is believed that the intermediate compounds generally include compounds according to formula IIa, wherein OAct represents an acylate, triflate, sulfonate, carbamylate, carbonylate, or combinations thereof, more preferably wherein OAct represents —$OSO_2CF_3$, —$OSO_2Y$, —OC(O)NYZ, —OC(O)Y wherein Y and Z are independently H, linear or branched $C_1$-$C_{20}$-alkyl, phenyl or benzyl. Other intermediate compounds, including those according to formulae IIb-IIh as illustrated below, may also be present, but the inventors do not wish to be bound by any theory. The formulae IIa-IIh are herein also simply referred to as formula II. Notably, the intermediates are formed by contacting the cycloadduct according to formula I with the acidic mixture and can be converted into the aromatic product according to formula III by contact with the further acid.

IIa

IIb

IIc

IId

IIe

IIf

IIg

IIh

In particular embodiments, $R_1$, $R_2$, $R_3$ and $R_4$ may be different for formulae II and/or III as from those as defined in formula I. For instance, in case $R_1$, $R_2$, $R_3$ and $R_4$ comprise ester, anhydride, amide and/or imide groups at the like, at least partially, an in situ hydrolysis may occur due to water which may be added to or produced in the reaction mixture, leading to formation of a hydrolysate (i.e. a product of hydrolysis) such as carboxylic acid groups. It may be appreciated that other reactions may also take place, depending on the solvent in which the reaction is carried out. For instance, a (trans)esterification or a (trans)amidation may take place if the reaction is carried out in an alcohol or amine comprising solvent. Accordingly, for the ring-opened compound according to formula II and/or the aromatized product according to formula III, $R_1$, $R_2$, $R_3$ and $R_4$ may be as defined for formula I and/or hydrolysates, amides or alternative esters thereof. Depending on the completion of the hydrolysis, (trans)esterification or (trans)amidation, a mixture of products wherein $R_1$, $R_2$, $R_3$ and $R_4$ as defined for formula I and one or more hydrolysates, esters or amides thereof may be formed. For example, in particular embodiments wherein $R_3$ and $R_4$ in the cycloadduct together represent the electron-withdrawing group —(CO)X(CO)—, this group may be hydrolyzed in situ such that $R_3$ and $R_4$ each represent —$CO_2H$ in formula II and/or III. Similarly, in the embodiments wherein $R_2$ and $R_4$ in the cycloadduct together represent —$CH_2ZC(O)$—, this group may be hydrolyzed in situ such that $R_2$ and $R_4$ in formula II and/or III represent —$CH_2ZH$ and —$CO_2H$ respectively. The hydrolysates can be formed during contacting the cycloadduct with the acidic mixture and/or after this step, for instance just before or during isolation of the intermediates involving the addition of water (vide infra).

The solid-dashed bond ═══ in formulae I and II represents a single or double bond. Preferably, the bond is a single bond, such that the cycloadduct is a compound according to formula Ia:

Ia

The presence of a single or double bond between the carbon atoms binding $R_3$ and $R_4$ in formula I typically depends on the starting materials in the preceding Diels-Alder reaction. In case the dienophile in this reaction comprised an alkene, said bond in formula I is typically a single bond while in case the dienophile in the reaction comprised an alkyne, said bond is typically a double bond. Further, in case the dienophile in the reaction comprised an alkyne and thus the bond between the carbon atoms binding $R_3$ and $R_4$ in formula I is a double bond, the aromatic product formed is typically a phenolic aromatic product according to formula IIIb.

In formula IIIb, the substituents $R_1$, $R_2$ and OH may be positioned at various positions on the benzene ring. This is indicated with the symbol "$R_1$, $R_2$, OH—" in formula IIIb. The substitution pattern is typically determined by which of the substituents migrate during aromatization of the intermediates II. Generally, migration only occurs when $R_1$ and $R_2$ are both not H. If the hydroxyl migrates, the aromatic product is according to formulae IIIba, IIIbb, or mixtures thereof. If the $R_2$ substituent migrates, the aromatic product is according to formula IIIbc. In some embodiments, the phenolic aromatic product may be according to formula IIIbd. A mixture of products comprising any two or more aromatic products according to formulae IIIba, IIIbb, IIIbc and IIIbd can also be formed by the present invention.

IIIba

In case the dienophile in the reaction comprised an alkene and thus the bond between the carbon atoms binding $R_3$ and $R_4$ in formula I is a single bond (as shown in formula Ia), the aromatic product formed is typically an aromatic product according to formula IIIa.

In the context of the present invention, the cycloadduct is typically derived from a Diels-Alder reaction of biomass-derived furanics with a dienophile. A diene can contain a furanic core structure based on the formula and is typically substituted on the positioned herein numbered as 2, 3, 4, and/or 5 by one or more alkyl chains, heteroatoms and/or halogens. Said diene, when used in a Diels-Alder reaction, can provide a cycloadduct comprising a 7-oxabicyclo[2.2.1]hept-2-ene core structure based on formula A:

In the present invention, the cycloadduct may undergo a ring-opening at the bond between the bridged oxygen and the carbon at positions 2 and/or 5 when contacted with the acidic mixture.

When the intermediate compounds are provided for step b), they are typically present in a mixture which comprises said intermediates together with the acidic mixture comprising the first acid and optionally the activating agent. This mixture may be the result of the ring-opening according to step a), meaning that the intermediates are continued after step a) directly in step b), without full removal of the acidic mixture. However, intermediate steps such as purification, one or more heating or cooling steps, concentration or diluting steps can be carried out in between the steps. Moreover, step b) can be carried out independently from step a). However, in a preferred embodiment, the process comprises both steps a) and b), which are even more preferably carried out uninterrupted.

Details on Step a)

Step a) relates to contacting the cycloadduct according to formula I with an acidic mixture comprising the first acid and optionally the activating agent to obtain the intermediate compound. The acid is preferably a dry acid, meaning that it is water-free. This is preferred as several preferred cycloadducts include water-sensitive groups such as anhydrides, esters and the like. In the presence of water, such groups can at least partially be hydrolyzed, resulting in a complex mixture of products and/or undesired products. Preferably, the first acid is selected from the group consisting of organic acids, dry inorganic acids and solid acids. The presence of small amounts of water may not be avoidable, but this should not be detrimental to the process. In preferred embodiments, the first acid used in the acidic mixture thus comprises low amounts of water, e.g. less than 4% based on the weight of the first acid that is used in the method. Furthermore, it is preferred that the activating agent used in the acidic mixture reacts with the water that is present in the mixture to scavenge any present water.

Examples of suitable organic acids include triflic acid, p-toluenesulfonic acid (pTSA), methanesulfonic acid (MSA), trifluoroacetic acid (TFA) and the like. Inorganic acids that may be used for the present invention include sulfuric acid ($H_2SO_4$), tetrafluoroboric acid ($HBF_4$), gaseous HCl and the like. Gaseous acids and acid in solution (such as $HBF_4$) are, for practical reasons, not the most desirable. Sulfuric acid is particularly preferred since it is neither gaseous nor dissolved and it is cost-efficient. Moreover, good yields were obtained with sulfuric acid. Solid acids may also be applied and may particularly be suitable for a continuous reaction wherein step a) is carried out in a tube/column reactor. Examples of solid acids include acidic ion exchange resin (e.g. Amberlyst™) and/or tetrafluoroethylene-based fluoropolymer-copolymer (e.g. Nafion™). The tube/column reactor may be equipped with a fixed acidic bed comprising the first acid. However, if step a) is carried out continuous in a reactor such as a continuous stirred tank reactor (CSTR), liquid acids such as sulfuric acid are preferred.

The amount of the first acid should not be too high in order to prevent side reactions such as the retro-Diels Alder reaction. However, it should neither be too low to prevent a slow or incomplete ring-opening reaction. As such, the first acid to cycloadduct are typically contacted in a molar ratio of at least 0.01:1, preferably in the range of 2:1 to 0.05:1, more preferably in a range of 1:1 to 0.1:1 such as about 0.5:1. Naturally, during the progression of the ring-opening reaction the molar ratio may change and with the molar ratio in the previous sentence is meant the molar ratio at the moment the first acid and the cycloadduct are first contacted (e.g. mixed or introduced in a reaction container).

The activating agent is typically selected from a group consisting of acylating agent, triflating agent, sulfonating agent, carbamylating agent, carbonylating agent. Preferably an acylating agent consisting of acetyl chloride, propionic anhydride, butyric anhydride, isobutyric anhydride, trimethylacetic anhydride, mixed anhydrides and combinations thereof is used. In said mixed anhydrides the groups adjacent to the acyl groups are different $C_1$-$C_{20}$ alkyl groups to one another. In a preferred embodiment of the present invention, the acylating agent is acetic anhydride. These activating agents described are typically commercially available.

The activation agent and cycloadduct can be contacted in a molar range of 30:1 to 1:1, preferably in a range of 10:1 to 2:1 such as about 4:1 to 6:1.

The bridging oxygen as shown in the above formula I will typically form a bond during the ring-opening process with a part of the activating agent. Without wishing to be bound to theory, the inventors believe that as such, the presence of the activating agent encourages fast ring-opening which limits the otherwise occurring unwanted retro-Diels-Alder reaction. The activating agent is therefore believed to contribute to the ring-opening at the bridged oxygen of the cycloadduct, such that said ring-opening is the main reaction.

By the above-described bond formation wherein a part of the activating group forms a bond with the bridging oxygen, another part of the activating group typically leaves the activating agent. Thus, for instance, if the activating group comprises a symmetrical anhydride (i.e. a non-mixed anhydride), a corresponding acid with respect to the part of the activating agent that forms a bond with the bridging oxygen is also formed. More specifically, if the activating agent comprises acetic acid anhydride, the oxygen is acylated and acetic acid is formed.

In case the activating agent comprises an anhydride, the activating agent can be represented by the chemical formula ActOAct such that a reaction of the activating group with the bridging oxygen results in ActOH and an Act-group that is attached to the typical intermediate compound. Thus, by a reaction of the activating agent with the cycloadduct, a reacted activating agent is formed, for instance, said ActOH. Said reacted activating agent can typically also be formed by reaction with water, instead of the cycloadduct. In case of an incomplete reaction and/or an excess of the activating agent with respect to the cycloadduct, unreacted activating agent may remain. In a preferred embodiment, the unreacted activating agent is removed under reduced pressure after the intermediates are formed and the cycloadduct is consumed. This eliminates the requirement of an extraction step, as is the case in the prior art. Typically, the reacted activating agent has a lower boiling point than the unreacted activating agent (i.a. due to its smaller size) and is concomitantly removed. The unreacted activating agent can be recycled in the process for increased overall efficiency.

For step a) of the present invention, the activating agent is preferably mixed with the first acid before contact with the cycloadduct. As is explained hereinabove, this typically results in an acidic mixture that is essentially free of water. In a typical embodiment, the acidic mixture is kept at a temperature of 0 to 80° C. before contact with the cycloadduct. It is believed that a cooler acidic mixture, for instance a mixture below 30° C., the unwanted retro Diels-Alder reaction is hindered and competes less with the ring-opening process upon contact with the cycloadduct.

The cycloadduct undergoing the ring-opening in accordance with step a) of the present invention is preferably a compound according to formula I wherein $R_1$ and/or $R_2$ are independently selected from the group consisting of H, $C_1$-$C_{20}$ alkyl, CHO and hydrazones, oximes, hemiacetals and acetals thereof, $CH_2OH$ and esters and ethers thereof, $CO_2H$ and esters thereof, and amides and tertiary amines of $CH_2NH_2$. The substituents $R_3$ and/or $R_4$ are independently selected from the group consisting of H, $CH_3$, acetals, hemiacetal, hydrazones and oximes of CHO, $CH_2OH$ and esters and ethers thereof, amides and tertiary amines of $CH_2NH_2$, and electron-withdrawing groups. The electron-withdrawing group can be selected from the group consisting of $CF_3$, $CCl_3$, $CBr_3$, $CI_3$, $NO_2$, CN, $CO_2Q$, C(O)NQ, C(=NT)Q, $SO_2Q$, $SO_3Q$, COQ, COF, COCl, COBr, COI, wherein Q and T are independently H, or linear or branched $C_1$-$C_6$-alkyl, optionally substituted with halogens and optionally polymer-supported. $R_3$ and $R_4$ can also together represent —(CO)X(CO)—, wherein X=O, $CH_2$, NH, NMe, Net, NPr, NBu, NPh, or S. $R_2$ and $R_4$ may also together represent —$CH_2ZC(O)$—, wherein Z is selected from the group consisting of O, NH and S.

The solid-dashed bond ═════ in formula I represent a single or double bond. Preferably, the bond is a single bond, such that the cycloadduct is a compound according to formula Ia:

In the embodiments wherein $R_3$ and $R_4$ together represent —(CO)X(CO)—, wherein X=O, $CH_2$, NH, NMe, Net, NPr, NBu, NPh, or S, the cycloadduct has a structure according to formula Ib.

In the embodiments wherein $R_3$ and $R_4$ together represent —(CO)X(CO)—, the bond between the carbon atoms binding $R_3$ and $R_4$ is typically a single bond, in accordance with structure Ic.

Ic

In the embodiments wherein $R_2$ and $R_4$ together represent —$CH_2ZC(O)$—, wherein Z is selected from the group consisting of O, NH and S, the cycloadduct has a structure according to formula Id.

Id

In a preferred embodiment of the present invention, $R_1$ and $R_2$ both are H or methyl. In a further preferred embodiment, $R_1$ is hydrogen and $R_2$ is methyl.

As is described hereinabove, the cycloadduct typically is a product from a Diels-Alder reaction between a diene and a dienophile. The desired $R_1$ and $R_2$ substituents can be provided by selecting the appropriate diene. In the preferred embodiments described in the above paragraph, the dienes typically used in said Diel-Alder reaction can be furan, 2,5-dimethylfuran, 2-methylfuran and are typically derived from biomass.

Typically, a dienophile comprising at least one electron-withdrawing group will facilitate the Diels-Alder reaction. In a preferred embodiment of the present $R_3$ and $R_4$ independently or together represent at least one electron-withdrawing group.

In a preferred embodiment of the present invention, $R_3$ and $R_4$ together represent the electron-withdrawing group —(CO)X(CO)—, wherein X=O, $CH_2$, NH, NMe, NEt, NPr, NBu, NPh, or S. More preferably $R_3$ and $R_4$ together represent —(CO)O(CO)—, —(CO)NMe(CO)—, —(CO)NEt(CO)— or —(CO)NPr(CO)—. As is described hereinabove, the cycloadduct typically derives from a Diels-Alder reaction between a diene and a dienophile. Thus, when $R_3$ and $R_4$ together represent —(CO)O(CO)—, the dienophile used in said Diels-Alder reaction to form the cycloadduct was maleic anhydride, whereas when $R_3$ and $R_4$ together represent respectively —(CO)NMe(CO)—, —(CO)NEt (CO)— or —(CO)NPr(CO)—, the dienophile used in said Diels-Alder reaction to form the cycloadduct were N-methylmaleimide, N-ethylmaleimide or N-propylmaleimide. These dienophiles are typically commercially available or can be obtained by the skilled person via well-known procedures.

Contacting the cycloadduct according to formula I with the acid mixture in step a) generally provides the ring-opened compound as the major (intermediate) product. It may be appreciated that the ring-opened cyclohexene compounds according to formula II may not be the only product formed in step a) that other ring-opened non-aromatic variations of the cyclohexene product may also be formed, as described herein-above. Further, some formation of the aromatic product may occur as well, even before step b) is initiated. In typical embodiments, step b) is initiated after the majority of the cycloadduct has been converted, e.g. after 80% has been consumed. In preferred embodiments, step b) is initiated after 90% or more of the cycloadduct has been consumed, most preferably after at least 95% or at least even 99% of the cycloadduct has been converted.

In the present invention, the ring-opened cyclohexene product according to formula II wherein Act (herein also referred to as the activating group) is the above-described part of the activating agent that formed with the bridging oxygen. The activating group (Act) in formula II is a remnant of the activating agent. Depending on the structure of the activating agent, OAct can represent an acylate, triflate, sulfonate, carbamylate, carbonylate, or combinations thereof. More specifically, Act can comprise structures such as —$SO_2CF_3$, —$SO_2Y$, —C(O)NYZ, —C(O)Y wherein Y and Z are independently H, linear or branched $C_1$-$C_{20}$-alkyl, phenyl or benzyl.

In the embodiments wherein the solid-dashed bond in formulae I and/or II ═══ represent a double bond, the aromatic product is typically a phenolic compound.

In a preferred embodiment of the present invention, the activating group comprises —C(O)Y, wherein preferably Y=Me. This can be achieved by selecting the activating agent comprising acetic acid anhydride.

The aromatized product of formula III is generally formed from the ring-opened cyclohexene product according to formula II by elimination of the —OAct group or groups as ActOH. In a typical embodiment of the invention, the eliminated reacted activating agent is a volatile compound such that it can be removed from the ring-opened product under reduced pressure. This may be carried out simultaneously with the removal of the unreacted activating agent.

In a particular embodiment of the present invention, the intermediates such as the ring-opened cyclohexene products are isolated and then converted into the aromatized product. Said conversion preferably takes place by using a heterogeneous catalyst, wherein the heterogeneous catalyst facilitates the aromatization process by eliminating the —OAct group.

Contacting the cycloadduct with the acidic mixture can be carried out at a temperature ranging from ~80 to 200° C., preferably in the range of ~40 to 150° C., more preferably at in the range of ~20 to 100° C., even more preferably 0 to 80° C. A relatively low temperature is typically preferred to avoid the unwanted retro-Diels-Alder reaction, which was found to at least partially occur at higher temperatures. As such, said temperature in step a) is preferably maintained below 50° C., more preferably below 30° C., such as about 0 to 20° C.

In the present invention, the cycloadduct can be contacted with the acidic mixture neat or dissolved in a suitable solvent, the former being preferred. A solvent can be suitably selected based on the specific cycloadduct used. In another, preferred embodiment of the present invention, contacting the cycloadduct with the acidic mixture is achieved by slowly adding said cycloadduct neat to said acidic mixture. Said addition of the cycloadduct typically is preferably carried out at a rate which prevents large exotherm (i.e. about 50 degrees above the starting temperature, or the temperature at which the rate of retro-Diels-Alder starts to increase significantly, increasing formation of by-products), which is normally less than 50 degrees above the starting temperature (i.e. the temperature of the contents of the reactor when addition of the cycloadduct is started), preferably less than 30 degrees above the starting temperature, such as for instance about 5 to 20 degrees above the starting temperature. The molar ratio of the activating agent to cycloadduct can typically be carried out within a range of 30:1 to 1:1, preferably in a range of 10:1 to 2:1. A preferred molar ratio of the present invention is about 4:1 to 6:1. Whereas the molar ratio of the first acid to cycloadduct is typically carried out in a range of 2:1 to 0.01:1, preferably in a range of 1:1 to 0.1:1. A preferred molar ratio of the present invention is about 0.5:1.

In a preferred embodiment of the present invention wherein acetic anhydride is used as the activating agent, the side-product formed during acylation comprises acetic acid.

Details on Step b)

At the core of the present invention lies the insight that a further acid can advantageously be used for the formation of the aromatic product from the intermediates. Thus, with the further acid is meant that more of the first acid and/or an additional acid is added with respect to the first acid that is used in step a), or with respect to the state, formulation or solution in which the intermediates compounds are provided into step b). The further acid may accordingly be an extra portion of the first acid or another acid.

As explained herein-above for step a), the amount of acid in step a) should not be too high in order to prevent the retro-Diels Alder reaction. The present inventors found that the amount of acid for step b) is much less critical to decomposition (albeit still influential to a fast, selective step b). Thus, wherein the most preferred molar ratio of the first acid to the cycloadduct is about 0.5:1, the preferred molar ratio of the total amount of acid present in step b) is at least 1 molar equivalents, more preferably at least 1.5 molar equivalents, even more preferably at least 2 equivalents based on the starting amount of the intermediates. This generally corresponds to the similar molar amount of the total acid with respect to the cycloadduct I. The total amount of acid present in step b) thus may include the amount of the first acid, the amount of the further acid and/or any other acid that may have been added and is still present or in contact with the intermediates before step b) is initiated.

The amount of further acid that is contacted with the intermediates is preferably at least 0.25 molar equivalents, more preferably at least 0.5 molar equivalents, even more preferably at least 1 equivalent, most preferably at least 2 equivalents based on the starting amount of the intermediates. As for the total amount of acid (i.e. the amount of the first and further acids) this can also be based on the amount of the cycloadduct I. The amount of further acid may be low with respect to the intermediates (e.g. 0.6 equivalents or even less), but this may still be relatively high with respect to the amount of the first acid that is most preferably used in step a), i.e. 0.5 equivalents. As such, even an amount of 0.5 equivalents of the further acid may mean a doubling of the total amount of acid that would be present if aromatization of the intermediates would be carried out without the further acid. Therefore, even a small amount of the further acid may already have a significant effect on the total amount of acid present in step b) and thus on the reaction rate in this step. In a particularly preferred embodiment, the amount of the further acid that is contacted with the intermediates is at least the same as the amount of the first acid that is contacting the cycloadduct.

The further acid is preferably a dry acid, meaning that it is essentially water-free. The reason for this is the same as provided above for step a): several preferred cycloadducts (and thus several preferred intermediates) include water-sensitive groups such as anhydrides, esters and the like (vide infra). In the presence of water, such group are potentially at least partially hydrolyzed, resulting in a complex mixture of products or undesired products. Preferably, the further acid is selected from the group consisting of organic acids, dry inorganic acids and solid acids. The presence of small amounts of water may not be avoidable, but this should not be detrimental to the process. In preferred embodiments, the further acid used in the acidic mixture thus comprises low amounts of water, e.g. less than 4% based on the weight of the first acid that is used in the method.

Examples of suitable organic acids include triflic acid, p-toluenesulfonic acid (pTSA), methanesulfonic acid (MSA), trifluoroacetic acid (TFA) and the like. Inorganic acids that may be used for the present invention include sulfuric acid ($H_2SO_4$), tetrafluoroboric acid ($HBF_4$), gaseous HCl and the like. Gaseous acids are for practical reasons not the most desirable, and neither are acid (such as $HBF_4$) in solutions. Sulfuric acid is particularly preferred since it is neither gaseous not dissolved and it is cost-efficient. Moreover, good yields were obtained with sulfuric acid.

In a preferred embodiment, the first acid and the further acid comprise the same type of acid, for instance sulfuric acid.

For step b), it is also particularly preferred that the further acid comprises a solid acid. With solid acid is meant an acid that remains solid during the process step or steps. A solid acid is particularly preferred for step b) because step b) can very suitably be carried out in a tube/column reactor, which can be equipped with a fixed acidic bed comprising the further acid. Examples of solid acids include acidic ion exchange resin (e.g. Amberlyst™) and/or tetrafluoroethylene-based fluoropolymer-copolymer (e.g. Nafion™). Strong solid acids such as the tetrafluoroethylene-based fluoropolymer-copolymers are typically preferred since step b) is not as sensitive to acid as step a).

Besides the presence of the further acid to effect aromatization of the intermediates, step b) preferably further comprises heating the intermediates to a temperature of more than 30° C., preferably in the range of 40° C. to 150° C., more preferably in the range of 45 to 120° C., even more preferably in the range of 50 to 100° C., most preferably in the range of 55 to 85° C., such as about 60° C. Higher temperature results in a faster reaction but may also lead to more side products and concomitantly to a lower yield. A reaction time of several hours, e.g. 2 hours, was found to be desirable for step b) and the amount of the further acid and the temperature can be adjusted accordingly.

Step b) can very suitably be carried out in a tube/column reactor comprising a fixed acidic bed comprising the further acid. This is particularly preferred for easy separation of the further acid from the aromatic product. Moreover, since step b) is not as sensitive to acid as step a), a large excess of a solid acid is less (or not) problematic.

In the embodiments wherein the further acid comprises a solid acid, in particular in case of the fixed acid bed, it is suitable to express the amount of further acid in terms of a volume ratio. A typical amount of the solid acid is in the range of 20 to 90 v %, based on the total reactor volume or volume occupied by the reaction medium and the fixed bed.

In contrast, step a) is relatively sensitive to acid and therefore preferably carried out in one or more continuously-stirred tank reactors (CSTRs). According, in a most preferred embodiment, steps a) and b) are continuous processes, preferably wherein step a) is carried out in one or more continuous-stirred tank reactors (CSTRs) and step b) is carried out in a tube/column reactor comprising an acidic packed bed that comprises the further acid.

Details on Further Steps

In a preferred embodiment of the present invention, the aromatic product is isolated by cooling or evaporative crystallization. Such isolation of the aromatic product can be carried out by cooling the reduced reaction mixture to solidify the aromatic product, for instance to a temperature in the range of ~20 to 80° C., preferably 0 to 25° C. At the appropriate temperature and concentration, a seed may be added to induce crystallization. The solidified aromatic product can be isolated from the reduced reaction mixture by filtering off said product.

Alternatively, or additionally, isolation of the aromatic product can be carried out by the addition of an anti-solvent to the reduced reaction mixture. This can be carried out before or without first concentrating the reaction mixture. Said anti-solvent is preferably selected from an alcohol solvent, ether solvent, water or combinations thereof, preferably the anti-solvent is water. Typically, when an anti-solvent is added to the reduced reaction mixture, the aromatic product solidifies resulting in a product herein referred to as the solidified aromatic product. To achieve a desirable level of solidification at least 5 molar equivalents of anti-solvent with respect to the amount of the cycloadduct at the start of the reaction is typically added. Preferably a range of 5 to 50 molar equivalent anti-solvent is added to the reduced reaction mixture. These amounts are particularly applicable to water as the anti-solvent.

Furthermore, higher levels of the solidified aromatic product can be achieved by cooling the reduced reaction mixture during and after addition of the anti-solvent. During addition and after addition—when water is used as the anti-solvent, said water may react with any residual anhydride and can cause a lot of heat to be released. This can lead to a mixture of products which is undesired for isolation purposes. Thus, cooling during and after the addition of water to the reduced reaction mixture may significantly slow down undesired reactions with water while said water still reacts with any residual anhydride. Cooling the reduced reaction mixture can be carried out at a temperature ranging from ~20 to 25° C., preferably 0 to 10° C.

In yet another embodiment of the present invention, the concentration of the reaction mixture under reduced pressure may not be needed to isolate the aromatic product. Such is the case when the aromatic product solidifies in the reaction mixture either with or without inducing cooling. Then the solidified aromatic product can be isolated by filtration. To increase the yield, the product remaining in the filtrate can be isolated through cooling, anti-solvent addition, and/or evaporative crystallization.

If the process mixture comprising the aromatic product (still) comprises unreacted activating agent, this activation agent may be recovered by this evaporation as well. For instance, the unreacted activating agent may be removed by evaporation under reduced pressure, e.g. at a pressure in the range of 0 to 1 bar, preferably in the range of 0.1 to 150 mbar, more preferably in the range of 1 to 100 mbar, even more preferably in the range of 5 to 50 mbar. Furthermore, the temperature of the reaction mixture is maintained during evaporation such that volatile compounds are removed, preferably at a range of 0 to 150° C. More preferably at a temperature in the range of 20 to 100° C. After an optional separation of the unreacted activating agent from the reacted activating agent, if required, the unreacted activating agent is preferably recycled in the process. This reduces the environmental footprint of the process, increases sustainability and provides a more efficient and economically more advantageous overall ring-opening process. The separated reacted agent can be used in other processes, sold off, or dehydrated to re-form the activating agent and used again in the process.

In case an anti-solvent is used to induce crystallization of the aromatic product, the inventors find that it is preferred to remove the unreacted activating agent before the addition of water because of its reaction to give the reacted activating agent such as acetic acid. This reaction would prevent recycling of the unreacted agent such as acetic anhydride.

Although isolation of the aromatic product by extraction is possible, it is particularly preferred that the processes described herein are free of a solvent extraction step. This reduces cost and the environmental footprint of the process.

In a particular embodiment of the present invention, for instance wherein $R_3$ and $R_4$ of formula III together represent —(CO)O(CO)— or —(CO)NEt(CO)—, a hydrolysis can be carried out with the aromatized product according to formula III to obtain phthalic acid according to formulae IVa, IVb or IVc (herein also together referred to as formula IV)

IVa

IVb

IVc wherein $R_1$ and $R_2$ are described as hereinabove for formula III. Conventional methods can be used for said hydrolyzing process.

Compounds such as phthalic acid according to formula IV can also be obtained by hydrolysis taking place in situ (i.e. during the ring-opening and/or aromatization process), in particular when there is sufficient water in the reaction process available for this hydrolysis.

For the purpose of clarity and a concise description, features are described herein as part of the same or separate embodiments. However, it will be appreciated that the scope of the invention may include embodiments having combinations of all or some of the features describes.

The invention is further illustrated by the following examples.

Example 1: Production of 3-Mpa Using Sulfuric Acid

A mixture of acetic anhydride (3.048 mL, 4 equivalents) with sulfolane as an internal standard (0.211 mL, 0.2 equivalent) was prepared and cooled to 0° C. To this solution, sulfuric acid (0.308 mL, 0.5 equivalents) was added dropwise. The solution was kept at 0° C. and the Diels-Alder adduct of 2-methylfuran and maleic anhydride (2.0 g, 1 equivalent) was slowly added (over roughly 30 minutes), keeping the temperature beneath 10° C. The mixture was left to stir until a precipitate was visible, then the reaction mixture was heated up to 60° C. At the moment the precipitate dissolved into solution, the reaction mixture was split up in 5 reaction tubes (Tubes A to E).). Tubes A-E contained respectively 0, 0.64, 1.28, 1.93 and 2.57 equivalent of sulfuric acid (relative to the Diels-Alder adduct of 2-methylfuran and maleic anhydride) before the reaction solution was added. This point was taken as t=0.

Reactions were analysed by NMR after 30, 70, 120, 180, 240 and 300 minutes at 60° C. Sampling was done by taking 45 μL of reaction mixture diluting in 550 μL CDCl3.

Figure 1:
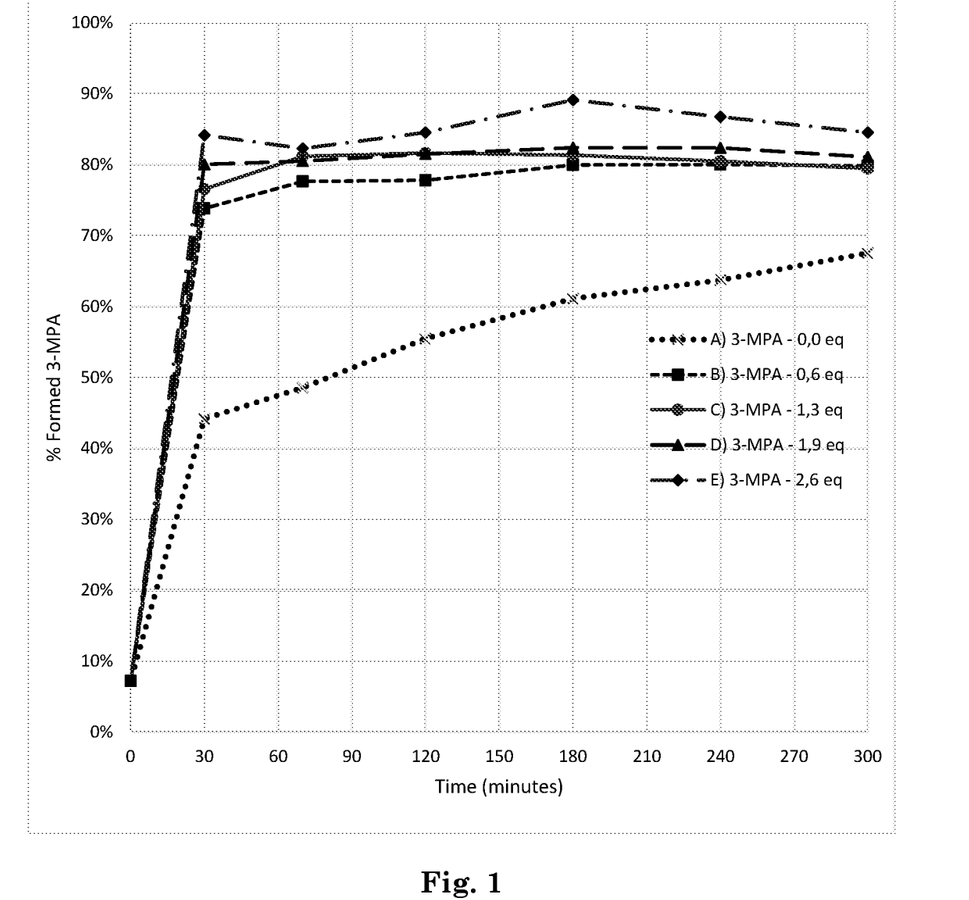
FIG. 1 is graph illustrating the amounts of 3-MPA formed in the processes of Example 1.

Results are provided in FIG. 1 which displays the formed amount of 3-methylphthalic anhydride (3-MPA) with different sulfuric acid concentrations. Further, based on the amounts of formed 3-MPA, residual intermediate and amount of maleic anhydride, the mass balances of tubes A-E were found to be respectively, 87.50%, 84.45%, 83.59%, 83.84% and 86.45%.

Based on these results, it can be concluded that the addition of 0.6 equivalents further sulfuric acid to the reaction has a significant effect on the reaction time—which could be decreased from 6 to ~2 hours. If 2.6 equivalents further acid is added, the reaction can already be stopped after ±30 minutes, with 1.5% intermediate remaining. This decreases the reaction time from 6 hours to <1 hour.

Example 2: Production of 3-Mpa Using Sulfuric Acid and Amberlyst-15

A mixture of acetic anhydride (3.048 mL, 4 equivalents) with sulfolane as an internal standard (0.211 mL, 0.2 equivalent) was prepared and cooled to 0° C. To this solution, sulfuric acid (0.308 mL, 0.5 equivalents) was added dropwise. The solution was kept at 0° C. and the Diels-Alder adduct of 2-methylfuran and maleic anhydride (2.0 g, 1 equivalent) was added slowly (over roughly 30 minutes), keeping the temperature beneath 10° C. The mixture was left to stir until a precipitate was visible, then the mixture was heated up to 60° C. At the moment the precipitate dissolved into solution, the reaction mixture was split up in 5 reaction tubes (Tubes A to E). Tubes A-E contained respectively 0, 50, 100, 200 and 400 mg of Amberlyst-15 resin before the reaction solution was added. This point was taken as t=0.

Reactions were analysed by NMR after 60, 120, 180, 240 and 300 minutes at 60° C. Sampling was done by taking 45 μL of reaction mixture diluting in 550 μL CDCl3.

Figure 2:
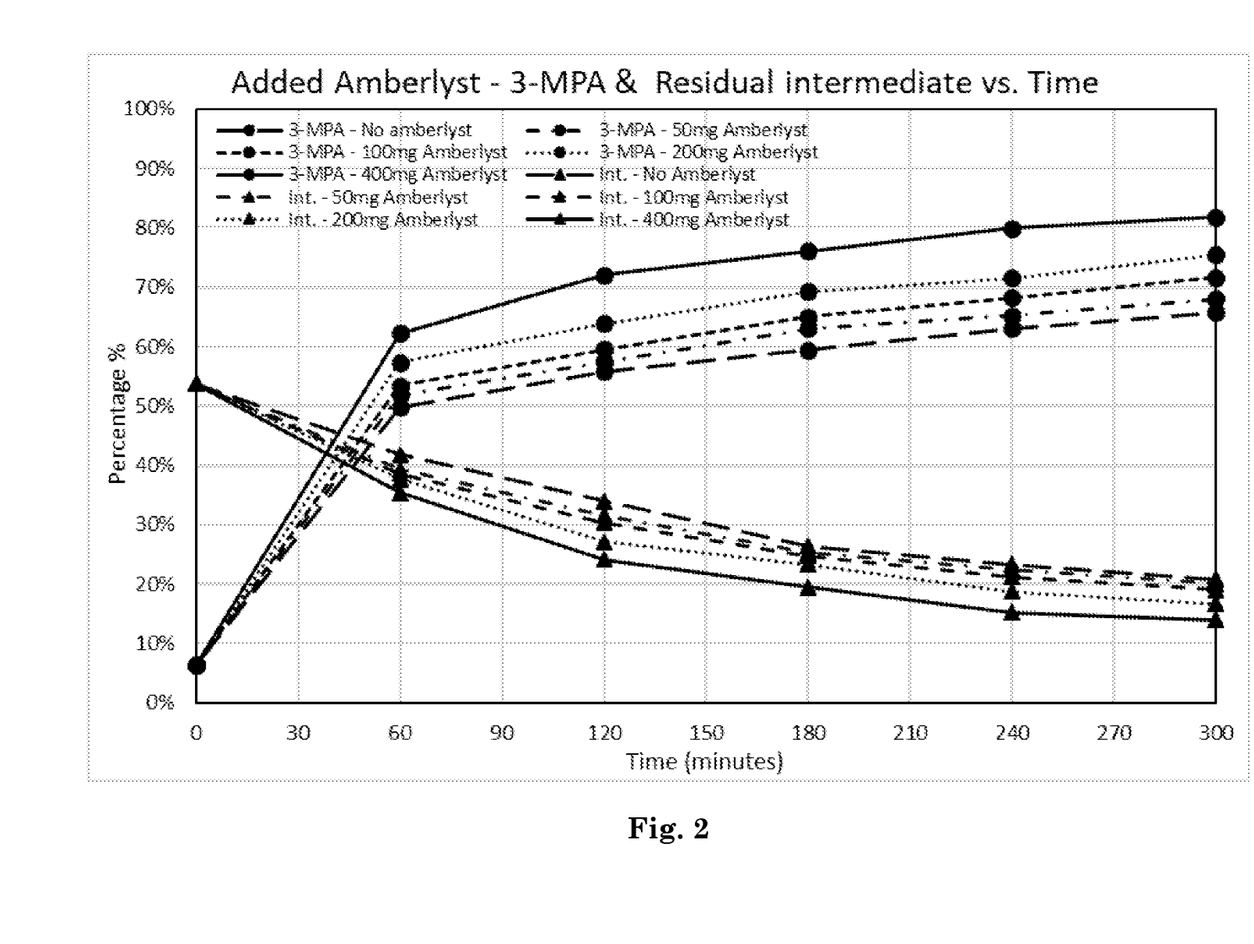
FIG. 2 is graph illustrating the amounts of 3-MPA formed in the processes of Example 2.

Results are provided in FIG. 2 which displays the formed amount of 3-methylphthalic anhydride (3-MPA) with different sulfuric acid concentrations. Further, based on the amounts of formed 3-MPA, residual intermediate and amount of maleic anhydride, the mass balances of tubes A-E were found to be respectively, 87.4%, 89.0%, 91.6%, 93.1% and 96.8%.

Based on these results, it can be concluded that addition of Amberlyst-15 to the reaction has a significant effect on the conversion in time, as well as the selectivity to 3-MPA. The strongest effects are observed at high Amberlyst-15 loading, with the conversion after 5 hours being 7% higher, and the yield on 3-MPA 16% higher. This corresponds to a more selective reaction, with lower by-product formation, which is clearly shown by the improved mass balance. A slight reduction in processing time can also be achieved by this approach.

Example 3: Production of 3-Mpa Using Sulfuric Acid and Trifluoroacetic Acid

A mixture of acetic anhydride (3.048 mL, 4 equivalents) with sulfolane as an internal standard (0.211 mL, 0.2 equivalent) was prepared and cooled to 0° C. To this solution, sulfuric acid (0.308 mL, 0.5 equivalents) was added dropwise. The solution was kept at 0° C. and the Diels-Alder adduct of 2-methylfuran and maleic anhydride (2.0 g, 1 equivalent) was slowly added (over roughly 30 minutes), keeping the temperature beneath 10° C. The mixture was left to stir until a precipitate was visible, then the reaction mixture was heated up to 60° C. At the moment the precipitate dissolved into solution, the reaction mixture was split up in 5 reaction tubes (Tubes A to E).). Tubes A-E contained respectively 0, 0.64, 1.28, 1.93 and 2.57 equivalent of trifluoroacetic acid (relative to the Diels-Alder adduct of 2-methylfuran and maleic anhydride) before the reaction solution was added. This point was taken as t=0.

Reactions were analysed by NMR after 30 and 90 minutes at 60° C. Sampling was performed by taking 45 μL of reaction mixture diluting in 550 μL CDCl3.

Figure 3:
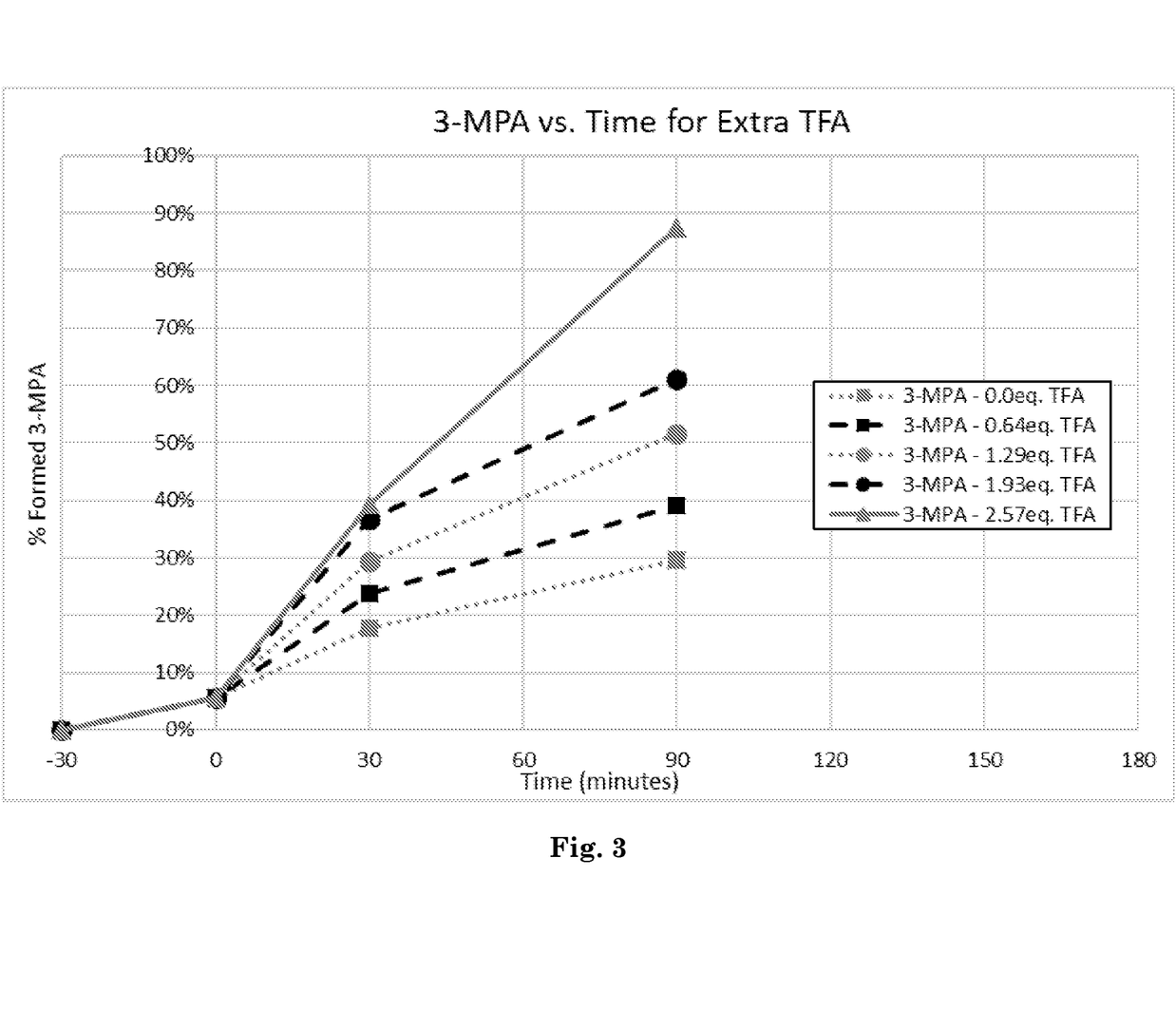
FIG. 3 is graph illustrating the amounts of 3-MPA formed in the processes of Example 3.

Results are provided in FIG. 3 which displays the formed amount of 3-methylphthalic anhydride (3-MPA) with different trifluoroacetic acid concentrations. Based on these results, it can be concluded that the addition of a small amount of trifluoracetic acid already significantly reduces the time required for conversion to 3-methylphthalic anhydride, and increasing the levels of trifluoroacetic acid further increases the rate of reaction, with almost complete conversion achieved after 90 minutes with 2.57 eq. of trifluoroacetic acid.

Example 4: Production of 3-Mpa Using Sulfuric Acid and Trifluoromethanesulfonic Acid A mixture of acetic anhydride (3.048 mL, 4 equivalents) with sulfolane as an internal standard (0.211 mL, 0.2 equivalent) was prepared and cooled to 0° C. To this solution, sulfuric acid (0.308 mL, 0.5 equivalents) was added dropwise. The solution was kept at 0° C. and the Diels-Alder adduct of 2-methylfuran and maleic anhydride (2.0 g, 1 equivalent) was slowly added (over roughly 30 minutes), keeping the temperature beneath 10° C. The mixture was left to stir until a precipitate was visible, then the reaction mixture was heated up to 60° C. At the moment the precipitate dissolved into solution, the reaction mixture was split up in 5 reaction tubes (Tubes A to E).). Tubes A-E contained respectively 0, 0.64, 1.28, 1.93 and 2.57 equivalent of trifluoromethanesulfonic acid (relative to the Diels-Alder adduct of 2-methylfuran and maleic anhydride) before the reaction solution was added. This point was taken as t=0.

Reactions were analysed by NMR after 30 and 90 minutes at 60° C. Sampling was performed by taking 45 μL of reaction mixture diluting in 550 μL CDCl3.

Figure 4:
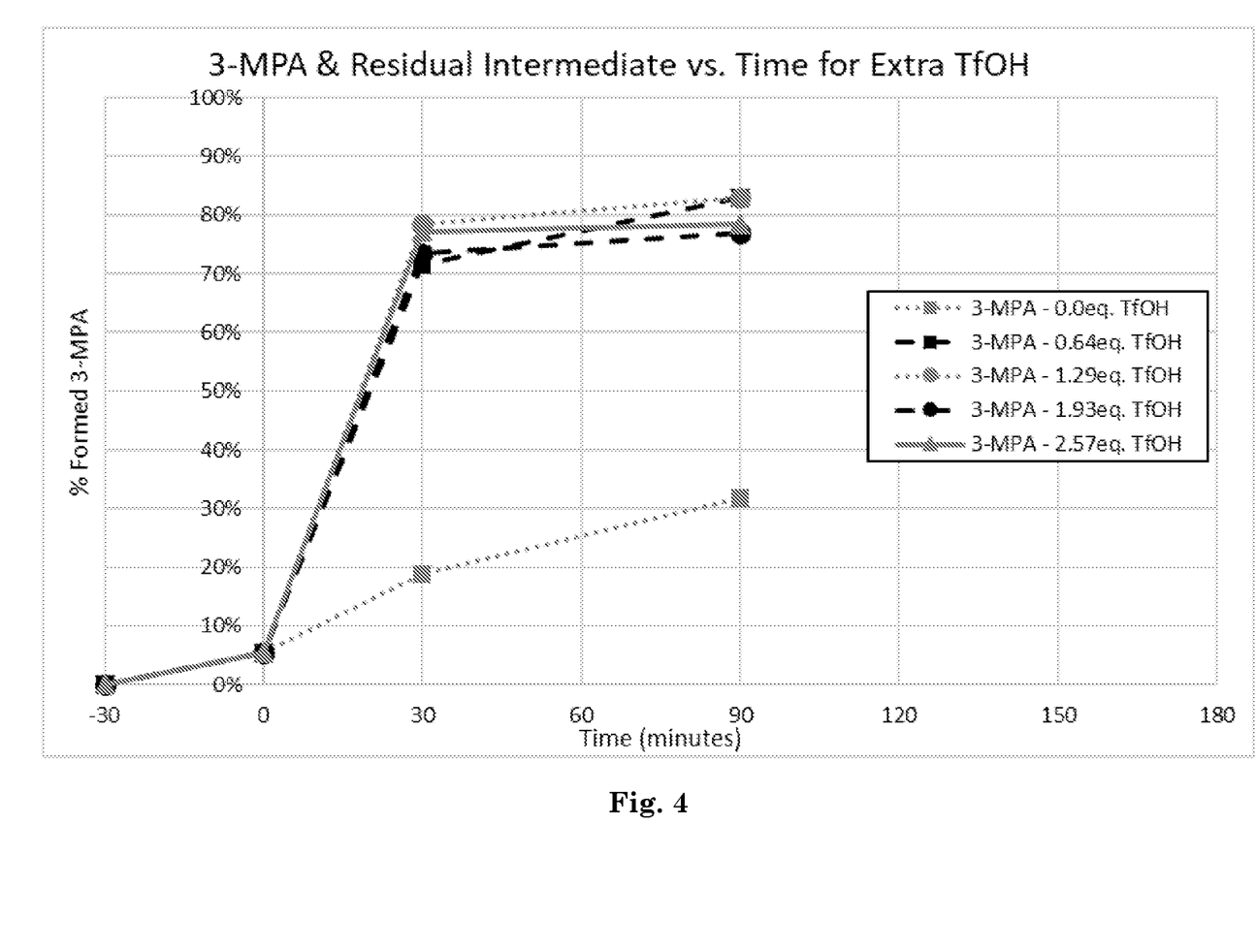
FIG. 4 is graph illustrating the amounts of 3-MPA formed in the processes of Example 4.

Results are provided in FIG. 4 which displays the formed amount of 3-methylphthalic anhydride (3-MPA) with different trifluoromethanesulfonic acid concentrations. Based on these results, it can be concluded that the addition of even a small amount of trifluoromethanesulfonic acid already significantly reduces the time required for conversion to 3-methylphthalic anhydride so that (almost) complete conversion has taken place within 30 minutes at all concentrations.

Example 5: Production of 3-Mpa Using Sulfuric Acid and Nafion-Nr50

A mixture of acetic anhydride (3.048 mL, 4 equivalents) with sulfolane as an internal standard (0.211 mL, 0.2 equivalent) was prepared and cooled to 0° C. To this solution, sulfuric acid (0.308 mL, 0.5 equivalents) was added dropwise. The solution was kept at 0° C. and the Diels-Alder adduct of 2-methylfuran and maleic anhydride (2.0 g, 1 equivalent) was slowly added (over roughly 30 minutes), keeping the temperature beneath 10° C. The mixture was left to stir until a precipitate was visible, then the reaction mixture was heated up to 60° C. At the moment the precipitate dissolved into solution, the reaction mixture was split up in 5 reaction tubes (Tubes A to E).). Tubes A-E contained respectively 0, 50, 100, 200 and 400 mg of Nafion-NR50 resin before the reaction solution was added. This point was taken as t=0.

Reactions were analysed by NMR after 30, 90, 120, 180 minutes at 60° C. Sampling was performed by taking 45 µL of reaction mixture diluting in 550 µL CDCl3.

Figure 5:
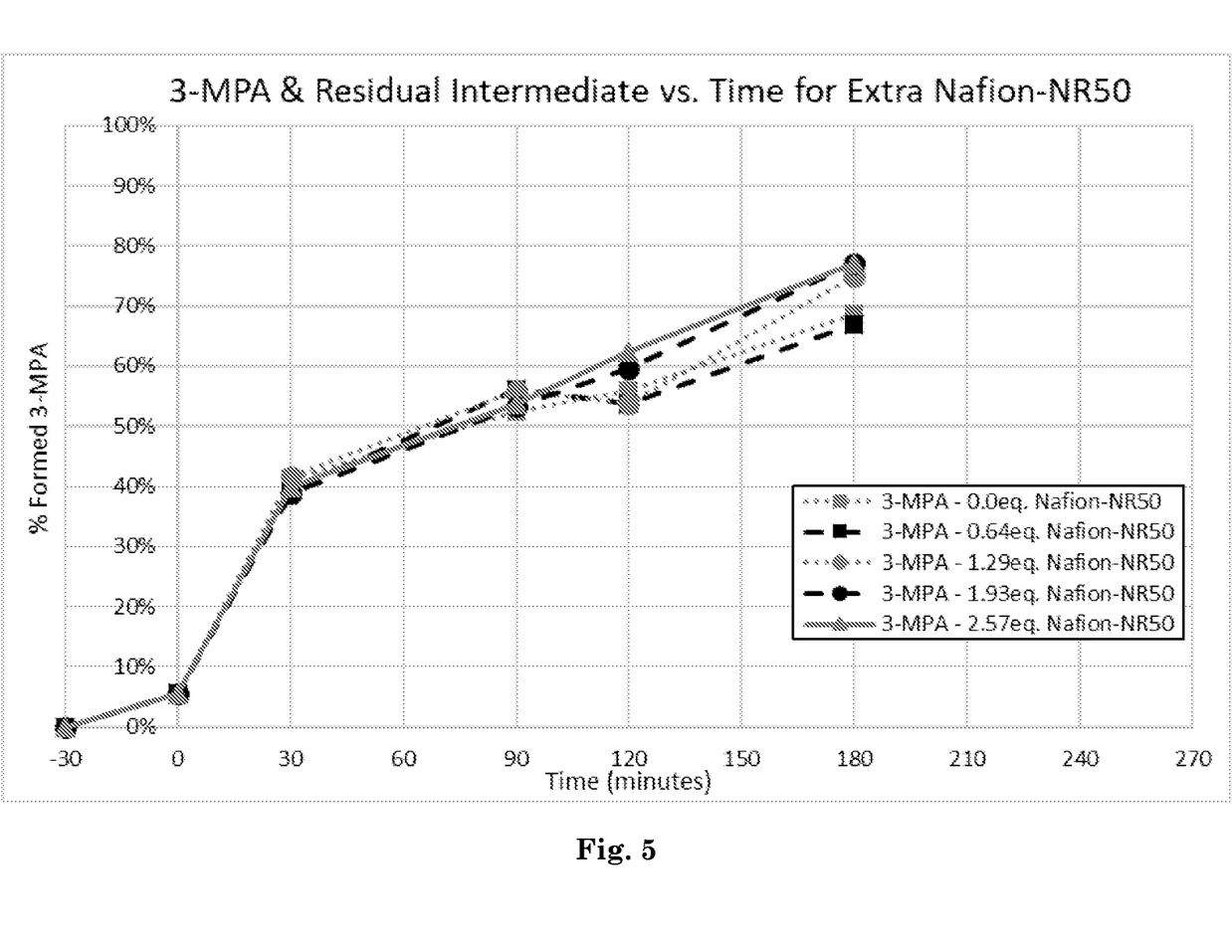
FIG. 5 is graph illustrating the amounts of 3-MPA formed in the processes of Example 5.

Results are provided in FIG. 5 which displays the formed amount of 3-methylphthalic anhydride (3-MPA) with different Nafion-NR50 loadings. Based on these results, it can be concluded that the addition of Nafion-NR50 has a small effect on the rate of reaction, with slightly higher yield of 3-methylphthalic anhydride achieved in the same time period when compared to the control reaction. Without wishing to be bound by theory, the difference between the results with Amberlyst-15 is believed to be due to the loading. The Nafion beads used in the present invention are approximately 20-50 times larger than the Amberlyst beads, so the relative acidic loading is very low. A mild acceleration with Amberlyst-15 (compared to no extra acid being added) is observed while the main advantage is in the selectivity (see Examples 1 and 2). Likely, increasing the acid loading of the Nafion beads further will give a significant rate increase while yielding the selectivity observed with Amberlyst-15.

Example 6: Production of 3-Mpa Using Sulfuric Acid and Amberlyst-36

A mixture of acetic anhydride (3.048 mL, 4 equivalents) with sulfolane as an internal standard (0.211 mL, 0.2 equivalent) was prepared and cooled to 0° C. To this solution, sulfuric acid (0.308 mL, 0.5 equivalents) was added dropwise. The solution was kept at 0° C. and the Diels-Alder adduct of 2-methylfuran and maleic anhydride (2.0 g, 1 equivalent) was slowly added (over roughly 30 minutes), keeping the temperature beneath 10° C. The mixture was left to stir until a precipitate was visible, then the reaction mixture was heated up to 60° C. At the moment the precipitate dissolved into solution, the reaction mixture was split up in 5 reaction tubes (Tubes A to E).). Tubes A-E contained respectively 0, 50, 100, 200 and 400 mg of Amberlyst-36 resin before the reaction solution was added. This point was taken as t=0.

Reactions were analysed by NMR after 30, 90, and 120 minutes at 60° C. Sampling was performed by taking 45 µL of reaction mixture diluting in 550 µL CDCl3.

Figure 6:
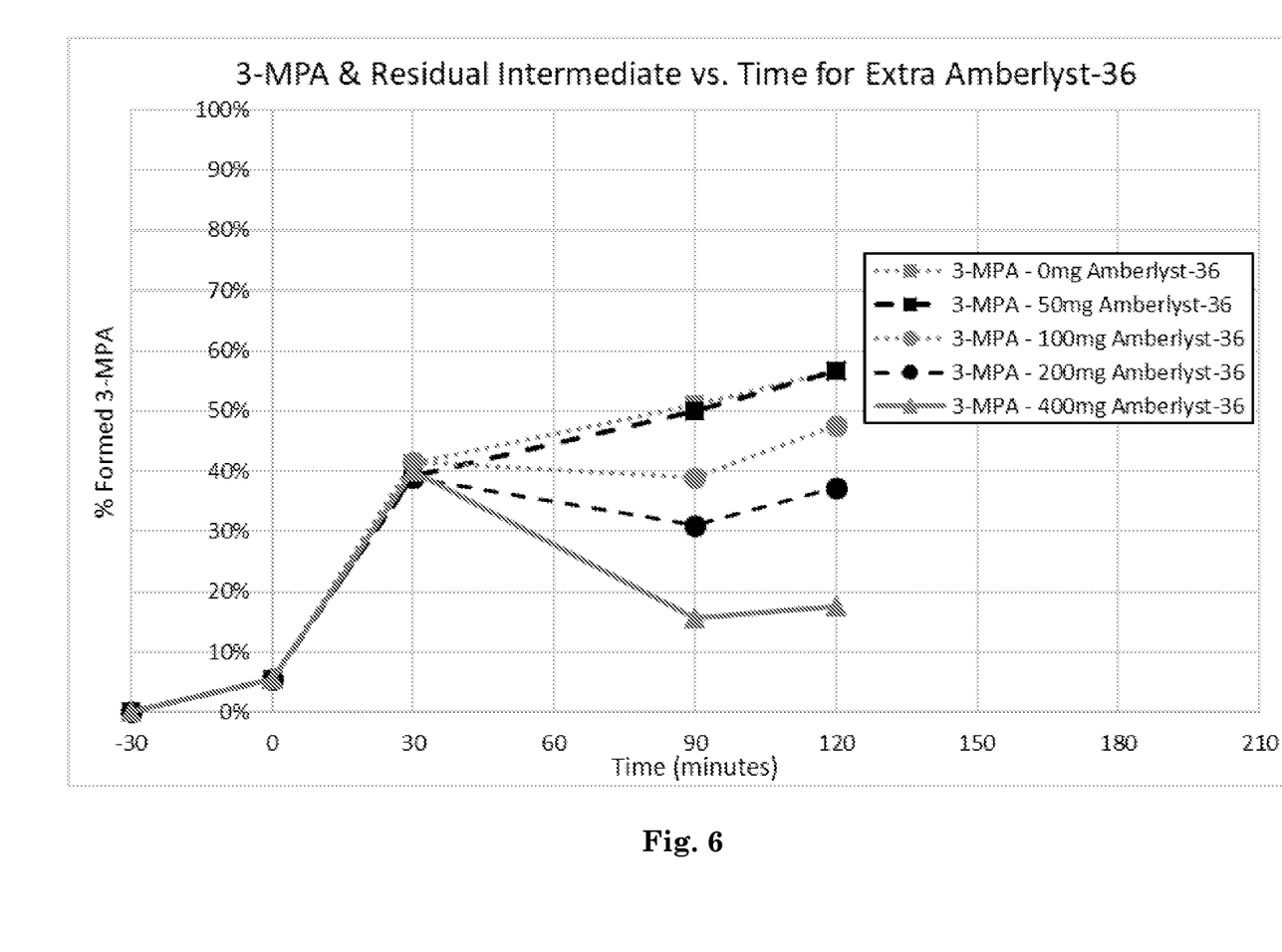
FIG. 6 is graph illustrating the amounts of 3-MPA formed in the processes of Example 6.

Results are provided in FIG. 6 which displays the formed amount of 3-methylphthalic anhydride (3-MPA) with different Amberlyst-36 loadings. Based on the results, it can be concluded that the addition of Amberlyst-36 has a small positive effect on the rate of reaction to 3-methylphthalic anhydride, but at higher loadings and longer reaction times hydrolysis of the product anhydride by water present in the resin results in poor selectivity from 3-methylphthalic anhydride. It was observed that the combined formation of 3-methylphthalic anhydride and of its hydrolysed product increased with the amount of Amberlyst-36 being present, which is a clear indication of a rate enhancement.

Example 7: Production of 3-Mpa Using Sulfuric Acid and Amberlyst-15

In a 1 L reactor, mixture of acetic anhydride (570 ml) and sulfuric acid (42 ml) was cooled to 0° C., then the Diels-Alder adduct formed between 2-methylfuran and maleic anhydride (272 g) was added over a period of 60 minutes, maintaining an internal temperature of less than 10° C. To the mixture was added Amberlyst-15 resin (40.85 g) and the mixture was heated to 60° C. and held for 6 hours. The mixture was then cooled to 0° C. and the formed solid was then isolated by filtration. The isolated product was then washed with acetic acid (100 ml). After drying, this yielded a mixture of 3-methylphthalic anhydride and Amberlyst-15 as an off-white solid with black resin present (190.15 g total=149.3 g 3-methylphthalic anhydride, 61.0%). The filtrates of the reaction were then analysed by NMR against an internal standard (dimethyl maleate) which showed a further 89.8 g of 3-methylphthalic anhydride to be present (36.7%). The selectivity to 3-methylphathalic anhydride was therefore 97.7%.

Comparative Example 1: Production of 3-Mpa Using Sulfuric Acid

In a 1 L reactor, mixture of acetic anhydride (571 ml) and sulfuric acid (42 ml) was cooled to 0° C., then the Diels-Alder adduct formed between 2-methylfuran and maleic anhydride (271 g) was added over a period of 60 minutes, maintaining an internal temperature of less than 10° C. The mixture was then heated to 60° C. and held for 6 hours. The mixture was then cooled to 0° C. and the formed solid was then isolated by filtration. The isolated product was then washed with acetic acid (100 ml). After drying, this yielded 3-methylphthalic anhydride as an off-white solid (111.4 g, 45.7%). The filtrates of the reaction were then analysed by NMR against an internal standard (dimethyl maleate) which showed a further 91.2 g of 3-methylphthalic anhydride to be present (37.4%). The selectivity to 3-methylphathalic anhydride was therefore 83.1%.

The invention claimed is:

1. A process for the preparation of an aromatic product according to formula IIIa or IIIb, said process comprising a step a) of contacting a cycloadduct according to formula I with an acidic mixture comprising a first acid and an activating agent to obtain one or more intermediate compounds, which is followed by a step b) of adding a further acid to the one or more intermediate compounds, which further acid is more of the first acid and/or an additional acid with respect to the first acid of step a) to form the aromatic product according to formula IIIa or IIIb, wherein the one or more intermediate compounds in step b) are present in a mixture including part of the acidic mixture, wherein,
- $R_1$ and $R_2$ are independently selected from the group consisting of H, $C_1$-$C_{20}$ alkyl, $CH_2OH$ and esters and ethers thereof, $CO_2H$ and esters thereof;
- $R_3$ and $R_4$ are independently selected from the group consisting of H, $CH_3$, $CH_2OH$ and esters and ethers thereof, $CO_2H$ and esters thereof, amides and tertiary amines of $CH_2NH_2$, and an electron-withdrawing group,
- or $R_3$ and $R_4$ together represent —(CO)X(CO)—, wherein X=O, $CH_2$, NH, NMe, NEt, NPr, NBu, NPh, or S;
- or $R_2$ and $R_4$ together represent —$CH_2$ZC(O)—, wherein Z is selected from the group consisting of O, NH and S; and
- ═══ represents a single or double bond, wherein the first acid and the further acid each individually comprises an acid selected from the group consisting of organic acids, dry inorganic acids and solid acids;
wherein the first acid and cycloadduct are contacted in a molar range of 2:1 to 0.01:1;
wherein the activating agent is selected from the group consisting of acylating agents, triflating agents, sulfonating agents, carbamylating agents, carbonylating agents, and combinations thereof;
wherein the activating agent and cycloadduct are contacted in a molar range of 30:1 to 1:1;
wherein the amount of further acid that is contacted with the one or more intermediate compound(s) is at least 0.25 molar equivalents based on the starting amount of the cycloadduct; and
wherein step a) is carried out at a temperature in the range of −20 to 60° C. and wherein step b) is carried out below 150° C.

2. The process according to claim 1, wherein step b) further comprises heating the intermediate compound(s) to a temperature of more than 30° C.

3. The process according to claim 1, wherein the first acid and the further acid comprise the same acid.

4. The process according to claim 1, wherein steps a) and b) are continuous processes.

5. The process according to claim 1, wherein said process comprises removing at least part of unreacted activating agent.

6. The process according to claim 1, wherein step b) is followed by isolating the aromatic product by cooling or evaporative crystallization.

7. The process according to claim 1, wherein said process further comprises the step of hydrolyzing the aromatic product to obtain a phthalic acid.

8. The process of claim 7, wherein said phthalic acid is according to any of formulae IVa-IVc 9. The process of claim 1, wherein the amount of further acid that is contacted with the one or more intermediate compound(s) is at 2 equivalents based on the starting amount of the cycloadduct.

10. The process of claim 1, wherein step a) is carried out at a temperature in the range of 10 to 60° C. and wherein step b) further comprises heating the intermediate compound(s) to a temperature in the range of 40° C. to 150° C.

11. The process of claim 1, wherein the electron-withdrawing group is selected from the group consisting of $CF_3$, $CCl_3$, $CBr_3$, $CI_3$, $NO_2$, CN, $SO_2Q$, $SO_3Q$, COQ, COF, COCl, COBr, COI, $CO_2Q$, C(O)NQ, and C(═NT)Q, wherein Q and T are independently H, or linear or branched $C_1$-$C_8$-alkyl, optionally substituted with halogens.

12. The process of claim 1, wherein $R_3$ and $R_4$ together represent —(CO)O(CO)—, —(CO)NMe(CO)—, —(CO)NEt(CO)— or —(CO)NPr(CO).

13. The process of claim 1, wherein $R_1$ and $R_2$ both are H or methyl, or $R_1$ is hydrogen and $R_2$ is methyl.

14. The process of claim 1, wherein the electron-withdrawing group is selected from the group consisting of $CF_3$, $CCl_3$, $NO_2$, CN, $SO_2Q$, $SO_3Q$, COQ, $CO_2Q$, C(O)NQ, and C(═NT)Q, wherein Q and T are independently H, or linear or branched $C_1$-$C_8$-alkyl, optionally substituted with halogens.

* * * * *